US012755085B2

(12) United States Patent
Korap

(10) Patent No.: US 12,755,085 B2
(45) Date of Patent: Oct. 6, 2026

(54) REPRESENTING VARIABLE TYPE FONTS

(71) Applicant: Monotype Imaging Inc., Woburn, MA (US)

(72) Inventor: Atilla Korap, Karben (DE)

(73) Assignee: Monotype Imaging Inc., Woburn, MA (US)

( * ) Notice: Subject to any disclaimer, the term of this patent is extended or adjusted under 35 U.S.C. 154(b) by 126 days.

(21) Appl. No.: 18/615,909

(22) Filed: Mar. 25, 2024

(65) Prior Publication Data

US 2025/0298960 A1 Sep. 25, 2025

(51) Int. Cl.
*G06F 40/109* (2020.01)

(52) U.S. Cl.
CPC .................................. *G06F 40/109* (2020.01)

(58) Field of Classification Search
CPC .................................................... G06F 40/109
See application file for complete search history.

(56) References Cited

U.S. PATENT DOCUMENTS 4,244,657 A 1/1981 Wasylyk
4,998,210 A 3/1991 Kadono et al.
5,263,132 A 11/1993 Parker et al.
5,347,266 A 9/1994 Bauman et al.
5,412,771 A 5/1995 Fenwick
5,416,898 A 5/1995 Opstad et al.
5,444,829 A 8/1995 Kawabata et al.
5,453,938 A 9/1995 Gohara et al.
5,526,477 A 6/1996 McConnell et al.
5,528,742 A 6/1996 Moore et al.
5,533,174 A 7/1996 Flowers et al.
5,586,242 A 12/1996 McQueen et al.
5,606,649 A 2/1997 Tai
(Continued)

FOREIGN PATENT DOCUMENTS

EP 0949574 A2 10/1999
EP 2166488 A2 3/2010
(Continued)

OTHER PUBLICATIONS

[No Author Listed], "Open Text Exceed, User's Guide, Version 14," Open Text, Nov. 2009, 372 pages.
(Continued)

*Primary Examiner* — Tadesse Hailu
(74) *Attorney, Agent, or Firm* — Fish & Richardson P.C.

(57) ABSTRACT

Methods, system, and apparatus, including computer programs encoded on a computer storage medium, for generating a custom design variation font file. In one aspect, a method comprises receiving a first font file comprising data that represents one or more fonts and an initial set of font variation axes, each font variation axis indicative of a style for the one or more fonts and comprising a range of allowable values, receiving data representing one or more font variation parameters, wherein each font variation parameter relates to a first selected allowable value within the range of allowable values for a corresponding font variation axis of the set of font variation axes, identifying a portion of the first font file based at least on the one or more font variation parameters, generating a second font file comprising data that represents an updated set of font variation axes, and initiating transmission of the second font file.

20 Claims, 6 Drawing Sheets

(56) References Cited

U.S. PATENT DOCUMENTS 5,619,721 A 4/1997 Maruko
5,630,028 A 5/1997 DeMeo
5,737,599 A 4/1998 Rowe et al.
5,748,975 A 5/1998 Van De Vanter
5,757,384 A 5/1998 Ikeda
5,761,395 A 6/1998 Miyazaki et al.
5,781,714 A 7/1998 Collins et al.
5,877,776 A 3/1999 Beaman et al.
5,926,189 A 7/1999 Beaman et al.
5,940,581 A 8/1999 Lipton
5,995,718 A 11/1999 Hiraike
6,012,071 A 1/2000 Krishna et al.
6,016,142 A 1/2000 Chang
6,031,549 A 2/2000 Hayes-Roth
6,044,205 A 3/2000 Reed et al.
6,065,008 A 5/2000 Simon et al.
6,073,147 A 6/2000 Chan et al.
6,111,654 A 8/2000 Cartier
6,141,002 A 10/2000 Kanungo et al.
6,167,441 A 12/2000 Himmel
6,249,908 B1 6/2001 Stamm
6,252,671 B1 6/2001 Peng et al.
6,282,327 B1 8/2001 Betrisey
6,313,920 B1 11/2001 Dresevic et al.
6,320,587 B1 11/2001 Funyu
6,323,864 B1 11/2001 Kaul et al.
6,330,577 B1 12/2001 Kim
6,343,301 B1 1/2002 Halt et al.
6,426,751 B1 7/2002 Patel
6,490,051 B1 12/2002 Nguyen et al.
6,512,531 B1 1/2003 Gartland
6,522,330 B2 2/2003 Kobayashi
6,522,347 B1 2/2003 Tsuji
6,583,789 B1 6/2003 Carlson et al.
6,601,009 B2 7/2003 Florschuetz
6,657,625 B1 12/2003 Chik et al.
6,675,358 B1 1/2004 Kido
6,678,688 B1 1/2004 Unruh
6,687,879 B1 2/2004 Teshima
6,704,116 B1 3/2004 Abulhab
6,704,648 B1 3/2004 Naik et al.
6,718,519 B1 4/2004 Taieb
6,738,526 B1 5/2004 Betrisey
6,754,875 B1 6/2004 Paradies
6,760,029 B1 7/2004 Phinney et al.
6,771,267 B1 8/2004 Muller
6,810,504 B2 10/2004 Cooper et al.
6,813,747 B1 11/2004 Taieb
6,853,980 B1 2/2005 Ying et al.
6,856,317 B2 2/2005 Konsella et al.
6,882,344 B1 4/2005 Hayes et al.
6,901,427 B2 5/2005 Teshima
6,907,444 B2 6/2005 Narasimhan et al.
6,952,210 B1 10/2005 Renner et al.
6,992,671 B1 1/2006 Corona
6,993,538 B2 1/2006 Gray
7,050,079 B1 5/2006 Estrada et al.
7,064,757 B1 6/2006 Opstad et al.
7,064,758 B2 6/2006 Chik et al.
7,155,672 B1 12/2006 Adler et al.
7,184,046 B1 2/2007 Hawkins
7,188,313 B2 3/2007 Hughes et al.
7,228,501 B2 6/2007 Brown et al.
7,231,602 B1 6/2007 Truelove et al.
7,346,845 B2 3/2008 Teshima et al.
7,373,140 B1 5/2008 Matsumoto
7,477,988 B2 1/2009 Dorum
7,492,365 B2 2/2009 Corbin et al.
7,505,040 B2 3/2009 Stamm et al.
7,539,939 B1 5/2009 Schomer
7,552,008 B2 6/2009 Newstrom et al.
7,580,038 B2 8/2009 Chik et al.
7,583,397 B2 9/2009 Smith
7,636,885 B2 12/2009 Merz et al.
7,701,458 B2 4/2010 Sahuc et al.
7,735,020 B2 6/2010 Chaudhri
7,752,222 B1 7/2010 Cierniak
7,768,513 B2 8/2010 Klassen
7,836,094 B2 11/2010 Ornstein et al.
7,882,432 B2 2/2011 Nishikawa et al.
7,937,658 B1 5/2011 Lunde
7,944,447 B2 5/2011 Clegg et al.
7,958,448 B2 6/2011 Fattic et al.
7,987,244 B1 7/2011 Lewis et al.
8,098,250 B2 1/2012 Clegg et al.
8,116,791 B2 2/2012 Agiv
8,201,088 B2 6/2012 Levantovsky et al.
8,201,093 B2 6/2012 Tuli
8,306,356 B1 11/2012 Bever
8,381,115 B2 2/2013 Tranchant et al.
8,413,051 B2 4/2013 Bacus et al.
8,464,318 B1 6/2013 Hallak
8,601,374 B2 12/2013 Parham
8,643,542 B2 2/2014 Wendel
8,643,652 B2 2/2014 Kaplan
8,644,810 B1 2/2014 Boyle
8,689,101 B2 4/2014 Fux et al.
8,707,208 B2 4/2014 DiCamillo
8,731,905 B1 5/2014 Tsang
9,063,682 B1 6/2015 Bradshaw
9,317,777 B2 4/2016 Kaasila et al.
9,319,444 B2 4/2016 Levantovsky
9,432,671 B2 8/2016 Campanelli et al.
9,449,126 B1 9/2016 Genoni
9,483,445 B1 11/2016 Joshi et al.
9,569,865 B2 2/2017 Kaasila et al.
9,626,337 B2 4/2017 Kaasila et al.
9,691,169 B2 6/2017 Kaasila et al.
9,805,288 B2 10/2017 Kaasila et al.
9,817,615 B2 11/2017 Seguin et al.
10,074,042 B2 * 9/2018 Wang ............... G06V 30/19173
10,115,215 B2 10/2018 Matteson et al.
10,140,261 B2 11/2018 Yang
10,157,332 B1 12/2018 Gray
2001/0021937 A1 9/2001 Cicchitelli et al.
2001/0052901 A1 12/2001 Kawabata et al.
2002/0010725 A1 1/2002 Mo
2002/0029232 A1 3/2002 Bobrow et al.
2002/0033824 A1 3/2002 Stamm
2002/0052916 A1 5/2002 Kloba et al.
2002/0057853 A1 5/2002 Usami
2002/0059344 A1 5/2002 Britton et al.
2002/0087702 A1 7/2002 Mori
2002/0093506 A1 7/2002 Hobson
2002/0120721 A1 8/2002 Eilers et al.
2002/0122594 A1 9/2002 Goldberg et al.
2002/0174186 A1 11/2002 Hashimoto et al.
2002/0194261 A1 12/2002 Teshima
2003/0014545 A1 1/2003 Broussard et al.
2003/0076350 A1 4/2003 Vu
2003/0197698 A1 10/2003 Perry et al.
2004/0025118 A1 2/2004 Renner
2004/0088657 A1 5/2004 Brown et al.
2004/0119714 A1 6/2004 Everett et al.
2004/0177056 A1 9/2004 Davis et al.
2004/0189643 A1 9/2004 Frisken et al.
2004/0207627 A1 10/2004 Konsella et al.
2004/0233198 A1 11/2004 Kubo
2005/0015307 A1 1/2005 Simpson et al.
2005/0033814 A1 2/2005 Ota
2005/0094173 A1 5/2005 Engelman et al.
2005/0111045 A1 5/2005 Imai
2005/0128508 A1 6/2005 Greef et al.
2005/0149942 A1 7/2005 Venkatraman
2005/0190186 A1 9/2005 Klassen
2005/0193336 A1 9/2005 Fux et al.
2005/0200871 A1 9/2005 Miyata
2005/0219247 A1 * 10/2005 Arnold .................. G06F 40/126
345/467
2005/0264570 A1 12/2005 Stamm
2005/0270553 A1 12/2005 Kawara
2005/0275656 A1 12/2005 Corbin et al.
2006/0010371 A1 1/2006 Shur et al.
2006/0017731 A1 1/2006 Matskewich et al.

(56) References Cited

U.S. PATENT DOCUMENTS

| | | | |
|---|---|---|---|
| 2006/0061790 A1 | 3/2006 | Miura | |
| 2006/0072136 A1 | 4/2006 | Hodder et al. | |
| 2006/0072137 A1 | 4/2006 | Nishikawa et al. | |
| 2006/0072162 A1 | 4/2006 | Nakamura | |
| 2006/0103653 A1 | 5/2006 | Chik et al. | |
| 2006/0103654 A1 | 5/2006 | Chik et al. | |
| 2006/0168639 A1 | 7/2006 | Gan | |
| 2006/0241861 A1 | 10/2006 | Takashima | |
| 2006/0245727 A1 | 11/2006 | Nakano et al. | |
| 2006/0253395 A1 | 11/2006 | Corbell | |
| 2006/0267986 A1 | 11/2006 | Bae et al. | |
| 2006/0269137 A1 | 11/2006 | Evans | |
| 2006/0285138 A1 | 12/2006 | Merz et al. | |
| 2007/0002016 A1 | 1/2007 | Cho et al. | |
| 2007/0006076 A1 | 1/2007 | Cheng | |
| 2007/0008309 A1 | 1/2007 | Sahuc et al. | |
| 2007/0024626 A1 | 2/2007 | Kagle et al. | |
| 2007/0050419 A1 | 3/2007 | Weyl et al. | |
| 2007/0055931 A1 | 3/2007 | Zaima | |
| 2007/0139412 A1 | 6/2007 | Stamm | |
| 2007/0139413 A1 | 6/2007 | Stamm et al. | |
| 2007/0159646 A1 | 7/2007 | Adelberg et al. | |
| 2007/0172199 A1 | 7/2007 | Kobayashi | |
| 2007/0211062 A1 | 9/2007 | Engleman et al. | |
| 2007/0283047 A1 | 12/2007 | Theis et al. | |
| 2008/0028304 A1 | 1/2008 | Levantovsky et al. | |
| 2008/0030502 A1 | 2/2008 | Chapman | |
| 2008/0115046 A1 | 5/2008 | Yamaguchi | |
| 2008/0118151 A1 | 5/2008 | Bouguet et al. | |
| 2008/0154911 A1 | 6/2008 | Cheng | |
| 2008/0222734 A1 | 9/2008 | Redlich et al. | |
| 2008/0243837 A1 | 10/2008 | Davis | |
| 2008/0282186 A1 | 11/2008 | Basavaraju | |
| 2008/0303822 A1 | 12/2008 | Taylor | |
| 2008/0306916 A1 | 12/2008 | Gonzalez et al. | |
| 2009/0031220 A1 | 1/2009 | Tranchant | |
| 2009/0037492 A1 | 2/2009 | Baitalmal et al. | |
| 2009/0037523 A1 | 2/2009 | Kolke et al. | |
| 2009/0063964 A1 | 3/2009 | Huang | |
| 2009/0070128 A1 | 3/2009 | McCauley et al. | |
| 2009/0097049 A1 | 4/2009 | Cho | |
| 2009/0100074 A1 | 4/2009 | Joung et al. | |
| 2009/0119678 A1 | 5/2009 | Shih | |
| 2009/0158134 A1 | 6/2009 | Wang | |
| 2009/0171766 A1 | 7/2009 | Schiff et al. | |
| 2009/0183069 A1 | 7/2009 | Duggan et al. | |
| 2009/0275351 A1 | 11/2009 | Jeung et al. | |
| 2009/0287998 A1 | 11/2009 | Kalra | |
| 2009/0290813 A1 | 11/2009 | He | |
| 2009/0303241 A1 | 12/2009 | Priyadarshi et al. | |
| 2009/0307585 A1 | 12/2009 | Tranchant et al. | |
| 2010/0014104 A1 | 1/2010 | Soord | |
| 2010/0066763 A1 | 3/2010 | MacDougall | |
| 2010/0088606 A1 | 4/2010 | Kanno | |
| 2010/0088694 A1 | 4/2010 | Peng | |
| 2010/0091024 A1 | 4/2010 | Myadam | |
| 2010/0115454 A1 | 5/2010 | Tuli | |
| 2010/0164984 A1 | 7/2010 | Rane | |
| 2010/0218086 A1 | 8/2010 | Howell et al. | |
| 2010/0231598 A1 | 9/2010 | Hernandez et al. | |
| 2010/0275161 A1 | 10/2010 | DiCamillo | |
| 2010/0321393 A1 | 12/2010 | Levantovsky | |
| 2011/0029103 A1 | 2/2011 | Mann et al. | |
| 2011/0032074 A1 | 2/2011 | Novack et al. | |
| 2011/0090229 A1 | 4/2011 | Bacus et al. | |
| 2011/0090230 A1 | 4/2011 | Bacus et al. | |
| 2011/0093565 A1 | 4/2011 | Bacus et al. | |
| 2011/0115797 A1 | 5/2011 | Kaplan | |
| 2011/0131153 A1 | 6/2011 | Grim, III | |
| 2011/0188761 A1 | 8/2011 | Boutros et al. | |
| 2011/0203000 A1 | 8/2011 | Bacus et al. | |
| 2011/0238495 A1 | 9/2011 | Kang | |
| 2011/0258535 A1 | 10/2011 | Adler, III et al. | |
| 2011/0271180 A1 | 11/2011 | Lee | |
| 2011/0276872 A1 | 11/2011 | Kataria | |
| 2011/0289407 A1 | 11/2011 | Naik | |
| 2011/0310432 A1 | 12/2011 | Waki | |
| 2012/0001922 A1 | 1/2012 | Escher et al. | |
| 2012/0016964 A1 | 1/2012 | Veen et al. | |
| 2012/0033874 A1 | 2/2012 | Perronnin et al. | |
| 2012/0066590 A1 | 3/2012 | Harris et al. | |
| 2012/0072978 A1 | 3/2012 | DeLuca et al. | |
| 2012/0092345 A1 | 4/2012 | Joshi et al. | |
| 2012/0102176 A1* | 4/2012 | Lee | G06F 40/154 709/223 |
| 2012/0102391 A1* | 4/2012 | Lee | G06F 40/154 715/235 |
| 2012/0127069 A1 | 5/2012 | Santhiveeran et al. | |
| 2012/0134590 A1 | 5/2012 | Petrou | |
| 2012/0215640 A1 | 8/2012 | Ramer et al. | |
| 2012/0269425 A1 | 10/2012 | Marchesotti | |
| 2012/0288190 A1 | 11/2012 | Tang | |
| 2012/0306852 A1 | 12/2012 | Taylor | |
| 2012/0307263 A1 | 12/2012 | Ichikawa et al. | |
| 2012/0323694 A1 | 12/2012 | Lita et al. | |
| 2012/0323971 A1 | 12/2012 | Pasupuleti | |
| 2013/0033498 A1 | 2/2013 | Linnerud et al. | |
| 2013/0054836 A1* | 2/2013 | Levien | G06F 16/1744 709/247 |
| 2013/0067319 A1 | 3/2013 | Olszewski et al. | |
| 2013/0120396 A1 | 5/2013 | Kaplan | |
| 2013/0127872 A1 | 5/2013 | Kaplan | |
| 2013/0156302 A1 | 6/2013 | Rodriguez Serrano et al. | |
| 2013/0163027 A1 | 6/2013 | Shustef | |
| 2013/0179761 A1 | 7/2013 | Cho | |
| 2013/0185028 A1 | 7/2013 | Sullivan | |
| 2013/0215126 A1* | 8/2013 | Roberts | G06Q 30/06 345/522 |
| 2013/0215133 A1 | 8/2013 | Gould et al. | |
| 2013/0321617 A1 | 12/2013 | Lehmann | |
| 2013/0326348 A1 | 12/2013 | Ip et al. | |
| 2014/0025756 A1 | 1/2014 | Kamens | |
| 2014/0047329 A1 | 2/2014 | Levantovsky et al. | |
| 2014/0052801 A1 | 2/2014 | Zuo et al. | |
| 2014/0089348 A1 | 3/2014 | Vollmert | |
| 2014/0136957 A1 | 5/2014 | Kaasila et al. | |
| 2014/0153012 A1 | 6/2014 | Seguin | |
| 2014/0176563 A1 | 6/2014 | Kaasila et al. | |
| 2014/0195903 A1 | 7/2014 | Kaasila et al. | |
| 2014/0282055 A1 | 9/2014 | Engel et al. | |
| 2014/0358802 A1 | 12/2014 | Biswas | |
| 2015/0020212 A1 | 1/2015 | Demaree | |
| 2015/0030238 A1 | 1/2015 | Yang et al. | |
| 2015/0036919 A1 | 2/2015 | Bourdev et al. | |
| 2015/0062140 A1 | 3/2015 | Levantovsky et al. | |
| 2015/0074522 A1 | 3/2015 | Harned, III et al. | |
| 2015/0097842 A1 | 4/2015 | Kaasila et al. | |
| 2015/0100882 A1 | 4/2015 | Severenuk | |
| 2015/0154002 A1 | 6/2015 | Weinstein et al. | |
| 2015/0178476 A1 | 6/2015 | Horton | |
| 2015/0193386 A1 | 7/2015 | Wurtz | |
| 2015/0220494 A1 | 8/2015 | Qin et al. | |
| 2015/0278167 A1 | 10/2015 | Arnold et al. | |
| 2015/0339273 A1 | 11/2015 | Yang et al. | |
| 2015/0339276 A1 | 11/2015 | Bloem et al. | |
| 2015/0339543 A1 | 11/2015 | Campanelli et al. | |
| 2015/0348297 A1 | 12/2015 | Kaasila et al. | |
| 2016/0078656 A1 | 3/2016 | Borson et al. | |
| 2016/0092439 A1 | 3/2016 | Ichimi | |
| 2016/0140952 A1 | 5/2016 | Graham | |
| 2016/0170940 A1 | 6/2016 | Levantovsky | |
| 2016/0171343 A1 | 6/2016 | Kaasila et al. | |
| 2016/0182606 A1 | 6/2016 | Kaasila et al. | |
| 2016/0196676 A1* | 7/2016 | Chapman | G06F 40/109 345/467 |
| 2016/0246762 A1 | 8/2016 | Eaton | |
| 2016/0307156 A1 | 10/2016 | Burner | |
| 2016/0307347 A1* | 10/2016 | Matteson | G06F 18/22 |
| 2016/0314377 A1 | 10/2016 | Vieira et al. | |
| 2016/0321217 A1 | 11/2016 | Ikemoto et al. | |
| 2016/0344828 A1 | 11/2016 | Hausler et al. | |
| 2016/0371232 A1 | 12/2016 | Ellis et al. | |
| 2017/0017778 A1 | 1/2017 | Ford et al. | |
| 2017/0024641 A1 | 1/2017 | Wierzynski | |

(56) References Cited

U.S. PATENT DOCUMENTS

| | | | |
|---|---|---|---|
| 2017/0098138 A1 | 4/2017 | Wang et al. | |
| 2017/0124503 A1 | 5/2017 | Bastide | |
| 2017/0237723 A1 | 8/2017 | Gupta et al. | |
| 2017/0357877 A1 | 12/2017 | Lin | |
| 2018/0039605 A1 | 2/2018 | Pao et al. | |
| 2018/0075455 A1 | 3/2018 | Kumnick et al. | |
| 2018/0082156 A1 | 3/2018 | Jin et al. | |
| 2018/0285965 A1 | 10/2018 | Kaasila et al. | |
| 2018/0332140 A1 | 11/2018 | Bullock | |
| 2018/0373921 A1 | 12/2018 | Di Carlo | |
| 2019/0019087 A1 | 1/2019 | Fukui | |
| 2019/0073537 A1 | 3/2019 | Arilla et al. | |
| 2019/0095763 A1 | 3/2019 | Arilla et al. | |
| 2019/0130232 A1 | 5/2019 | Kaasila et al. | |
| 2022/0301244 A1* | 9/2022 | Kumawat | G06T 11/203 |
| 2025/0029294 A1* | 1/2025 | Dhanuka | G06T 11/203 |
| 2025/0238595 A1* | 7/2025 | Kumar | G06F 3/0482 |

FOREIGN PATENT DOCUMENTS

| | | | |
|---|---|---|---|
| EP | 2857983 | A2 | 4/2015 |
| JP | 06-258982 | A | 9/1994 |
| JP | H10-124030 | A | 5/1998 |
| JP | 2002-507289 | A | 3/2002 |
| JP | 2003-288184 | A | 10/2003 |
| JP | 2005-215915 | A | 8/2005 |
| JP | 2005-217816 | A | 8/2005 |
| JP | 2007-011733 | A | 1/2007 |
| JP | 2009-545064 | A | 12/2009 |
| JP | 5140997 | B2 | 11/2012 |
| TW | 544595 | B | 8/2003 |
| TW | 2005/11041 | A | 3/2005 |
| WO | WO 1994/023379 | A1 | 10/1994 |
| WO | WO 1999/000747 | A1 | 1/1999 |
| WO | WO 1999/000760 | A2 | 1/1999 |
| WO | WO 2001/091088 | A1 | 11/2001 |
| WO | WO 2003/023614 | A2 | 3/2003 |
| WO | WO 2004/012099 | A2 | 2/2004 |
| WO | WO 2005/001675 | A2 | 1/2005 |
| WO | WO 2008/013720 | A2 | 1/2008 |

OTHER PUBLICATIONS

[No Author Listed], "Suitcase 10.2, Quick Start Guide for Macintosh," Extensis, 2001, 23 pages.

[No Author Listed], "TrueType Fundamentals," Microsoft Typography, Nov. 1997, pp. 1-17.

[No Author Listed], "Upgrading from Suitcase Server," Universal Type Server, Sep. 29, 2009, 18 pages.

[No Author Listed], "PostScript Language Reference—Third Edition," Adobe Systems Incorporated, Feb. 1999, pp. 313-390.

Adobe Systems Incorporated, "The Type 42 Font Format Specification," Technical Note #5012, Jul. 31, 1998, 28 pages.

Adobe Systems Incorporated, "To Unicode Mapping File Tutorial," Adobe Technical Note #5411, XP002348387, May 29, 2003, 43 pages.

blog.manufacturaindependente.org [online], "A first experiment with multicolored web fonts," Feb. 28, 2011, retrieved on Feb. 28, 2011, retrieved from URL<http://blog.manufacturaindependente.org/2011/02/a-first-experiment-with-multicoloured-web-fonts/>, 3 pages.

blog.typekit.com [online], "Announcing Speakeasy: A new open-source language tool from Typekit," Oct. 28, 2010, retrieved on Jul. 19, 2011, retrieved from URL<http://blog.typekit.com/2010/10/28/announcing-speakeasy-a-new-open-source-language-tool-from-typekit/>, 3 pages.

Celik et al., "W3C, CSS3 Module: Fonts," W3C Working Draft, Jul. 31, 2001, pp. 1-30.

Chen et al., "Detecting and Reading Text in Natural Scenes," Proceedings of the 2004 IEEE Computer Society Conference Vision and Pattern Recognition, Jun. 27, 2004, pp. 1-8.

cs229.stanford.edu [online], "Optical Character Recognition: Classification of Handwritten Digits and Computer Fonts," available on or before Aug. 1, 2014, via Internet Archive: Wayback Machine URL<https://web.archive.org/web/20140801114017/http://cs229.stanford.edu/proj2011/Margulis-OpticalCharacterRecognition.pdf> retrieved on Apr. 20, 2018, retrieved from URL<http://cs229.stanford.edu/proj2011/Margulis>, 5 pages.

developer.apple.com [online], "The True Type Font File," Oct. 27, 2000, retrieved on Apr. 3, 2018, retrieved from URL<http://developer.apple.com/fonts/TTRefMan/RM06/Chap6.html>, 7 pages.

en.wikipedia.org [online] "Saffron Type System," Mar. 17, 2013, retrieved on Nov. 12, 2014, retrieved from URL<http://en.wikipediaorg/w/index.php?title=SaJlron_Type_System&oldi <.1=545048094>, 7 pages.

fontpair.co [online], "Font Pair," available on or before Jan. 20, 2015, via Internet Archive: Wayback Machine URL<http://web.archive.org/web/20150120231122/http://fontpair.co/> retrieved on Apr. 18, 2017, retrieved from URL< http://fontpair.co>, 31 pages.

forums.macrumors.com [online], "which one is the main FONTS folder?" May 19, 2006, retrieved on Jun. 19, 2017, retrieved from URL<https://forums.macrumors.com/threads/which-one-is-the-main-fontsfolder.202284/>, 7 pages.

gautamg.wordpress.com [online], "Quite 'Writly' Said!," One Brick at a Time, Aug. 21, 2006, retrieved on Sep. 23, 2013, retrieved from URL<http://gautamg.wordpress.com/2006/08/21/quj.te-writely-said/>, 3 pages.

help.adobe.com [online], "Flash CS4 Professional ActionScript 2.0," 2007, retrieved on Aug. 31, 2015, retrieved from URL<http://help.adobe.com/en_US/AS2LCR/Flash_10.0/help.html?content=00000284.htm 1>, 2 pages.

ilovetypography.com [online], "An Introduction to OpenType Substitution Features," available on or before Dec. 26, 2012, via Internet Archive: Wayback Machine URL<http://web.archive.org/web/20121226233317/http://ilovetypography.com/OpenType/opentype-features>, retrieved on Sep. 18, 2014, retrieved form URL<http://ilovetypography.com/OpenType/opentype-features>, 12 pages.

Kataria et al., "Font retrieval on a large scale: An experimental study," 2010 17$^{th}$ IEEE International Conference on Image Processing (ICIP 2010), Sep. 26-29, 2010, pp. 2177-2180.

Koren et al., "Visualization of labeled data using linear transformations," IEEE Symposium on Information Visualization, Jul. 2003, 8 pages.

Liu et al. "Distortion-Guided Structure-Driven Interactive Exploration of High-Dimensional Data," Computer Graphics Forum, 2014, 33(3):101-110.

Liu, "Visual Exploration and Comparative Analytics of Multidimensional Data Sets," Thesis for the degree of Doctor of Philosophy, Graduate Program in Computer Science and Engineering, The Ohio State University, 2016, 210 pages.

Ma et al., "Framework for adaptive content delivery in heterogeneous network environments," InMultimedia Computing and Networking, Jan. 24, 2000, 3969:86-100.

manufacturaindependente.com [online], "colorfont/v1," Feb. 28, 2011, retrieved on Apr. 3, 2018, retrieved from URL<http://manufacturaindependente.com/colorfont/v1/, 1 page.

photofont.com [online], "photofont.com—Use photofonts," available on or before Sep. 2, 2012, via Internet Archive: Wayback Machine URL<http://web.archive.org/web/20120902021143/http://photofont.com/photofont/use/web > retrieved on Apr. 3, 2018, retrieved from URL<http://photofont.com/photofont/use/web.>, 2 pages.

sketchpad.net [online], "Using OpenType® Fonts with Adobe® InDesign®," available on or before Jun. 11, 2012, via Internet Archive: Wayback Machine URL <http://webarchive.org/web/20121223032924/http://www.sketchpad.net/opentype-indesign.htm>, retrieved on Sep. 22, 2024, retrieved from URL<http://www.sketchpad.net/opentype-indesign.htm>, 2 pages.

typeconnection.com [online], "typeconnection," Feb. 26, 2015, retrieved on Jan. 16, 2018, retrieved from URL<http://web.archive.org/web/20150226074717/http://www.typeconnection.com/stepl.php> 4 pages.

Wu et al., "Stochastic neighbor projection on manifold for feature extraction," Neurocomputing, Oct. 2011, 74(17):2780-2789.

* cited by examiner

REPRESENTING VARIABLE TYPE FONTS

BACKGROUND

This description relates to using fonts to render textual content. Along with the growth of available textual content from many sources that are Internet accessible, the number of available fonts to present the textual content has grown by a staggering amount.

Proportional to the astronomical growth of available textual content, for example via the Internet, user demand to express such content has grown. Similar to the variety of products provided by online stores; content authors, publishers, graphic designers, etc. have grown accustomed to having a vast variety of fonts to present textual content.

SUMMARY

This specification relates to customizing a font file, e.g., that maps data to glyphs, or a vector encoding of an image that corresponds with particular characters, based on user-selected parameters. In particular, this specification describes a font file production system that can execute various operations associated with font files. For example, the system can produce, customize (e.g., append, delete, alter, etc.), track, etc. font files. Being employed, the system can enable a selector, e.g., a user, to selectively customize a font file for an intended use by selecting one or more font variation parameters. Each font variation parameter can control the variation for the font along a corresponding font variation axis, e.g., by relating a range of allowable values of variation along the font variation axis or entirely removing the font variation axis. The system can then identify a portion of the font file based on the one or more font variation parameters to generate a custom design variation font file for the user's needs.

In one aspect, a computing device implemented method includes receiving a first font file including data that represents one or more fonts and an initial set of font variation axes, each font variation axis indicative of a style for the one or more fonts and including a range of allowable values. The method additionally includes receiving data representing one or more font variation parameters, wherein each font variation parameter relates to a first selected allowable value within the range of allowable values for a corresponding font variation axis of the set of font variation axes. The method can then identify a portion of the first font file based at least on the one or more font variation parameters. The method can then generate a second font file including data that represents an updated set of font variation axes based at least on the portion of the first font file identified by the one or more font variation parameters. The method further includes initiating transmission of the second font file, e.g., as a result back to an end-user that selected the one or more font variation parameters.

In an example, the data of the first font file represents a first design space parametrized by the initial set of font variation axes and the data of the second font file represents a second design space parametrized by the updated set of font variation axes.

In an example, the data of the second font file is renderable to present a graphical representation of the second design space.

In an example, the graphical representation includes a default style center point and a radial line for each font variation axis in the updated set of font variation axes beginning at the default style center point, wherein a length of each radial line is indicative of the range of allowable values from the default style center point to a terminus representing the first selected allowable value for the corresponding font variation axis.

In an example, the graphical representation further includes a display of one or more glyphs at the terminus of each radial line corresponding with the first selected allowable value for the updated font variation axis.

In an example, the method further includes receiving data corresponding to one or more termini of each radial line, wherein the data includes a selection of the one or more font variation parameters along each font variation axis.

In an example, identifying the portion of the first font file for each font variation parameter includes truncating the range of allowable values of the corresponding font variation axis to generate an updated variation axis in accordance with the first selected allowable value of the font variation parameter.

In an example, receiving the first font file further includes obtaining an open-type variable font file.

In an example, the method further includes receiving an additional font variation axis, and adding the additional font variation axis to the initial set of font variation axes.

In a second aspect, a system includes a computing device that includes a memory configured to store instructions. The system also includes a processor to execute the instructions to perform operations that include receiving a first font file including data that represents one or more fonts and an initial set of font variation axes, each font variation axis indicative of a style for the one or more fonts and including a range of allowable values. Operations additionally include receiving data representing one or more font variation parameters, wherein each font variation parameter relates to a first selected allowable value within the range of allowable values for a corresponding font variation axis of the set of font variation axes. Operations further include identifying a portion of the first font file based at least on the one or more font variation parameters. Operations further include generating a second font file including data that represents an updated set of font variation axes based at least on the portion of the first font file identified by the one or more font variation parameters and initiating transmission of the second font file, e.g., as a result back to the end-user that selected the one or more font variation parameters.

In an example, the data of the first font file represents a first design space parametrized by the initial set of font variation axes and the data of the second font file represents a second design space parametrized by the updated set of font variation axes.

In an example, the data of the first font file represents a first design space parametrized by the initial set of font variation axes and the data of the second font file represents a second design space parametrized by the updated set of font variation axes.

In an example, the data of the second font file is renderable to present a graphical representation of the second design space.

In an example, the graphical representation includes a default style center point and a radial line for each font variation axis in the updated set of font variation axes beginning at the default style center point, wherein a length of each radial line is indicative of the range of allowable values from the default style center point to a terminus representing the first selected allowable value for the corresponding font variation axis.

In an example, the system further includes receiving data corresponding to one or more termini of each radial line, wherein the data includes a selection of the one or more font variation parameters along each font variation axis.

In an example, identifying the portion of the first font file for each font variation parameter includes truncating the range of allowable values of the corresponding font variation axis to generate an updated variation axis in accordance with the first selected allowable value of the font variation parameter.

In a third aspect, a system includes one or more computer readable media storing instructions that are executable by a processing device, and upon such execution cause the processing device to perform operations that include receiving a first font file including data that represents one or more fonts and an initial set of font variation axes, each font variation axis indicative of a style for the one or more fonts and including a range of allowable values. Operations additionally include receiving data representing one or more font variation parameters, wherein each font variation parameter relates to a first selected allowable value within the range of allowable values for a corresponding font variation axis of the set of font variation axes. Operations further include identifying a portion of the first font file based at least on the one or more font variation parameters. Operations further include generating a second font file including data that represents an updated set of font variation axes based at least on the portion of the first font file identified by the one or more font variation parameters and initiating transmission of the second font file, e.g., as a result back to the end-user that selected the one or more font variation parameters.

In an example, the data of the first font file represents a first design space parametrized by the initial set of font variation axes and the data of the second font file represents a second design space parametrized by the updated set of font variation axes.

In an example, the data of the second font file is renderable to present a graphical representation of the second design space.

In an example, the graphical representation includes a default style center point and a radial line for each font variation axis in the updated set of font variation axes beginning at the default style center point, wherein a length of each radial line is indicative of the range of allowable values from the default style center point to a terminus representing the first selected allowable value for the corresponding font variation axis.

In an example, the operations further include receiving data corresponding to one or more termini of each radial line, wherein the data includes a selection of the one or more font variation parameters along each font variation axis.

Particular embodiments of the subject matter described in this specification can be implemented so as to realize one or more of the following advantages.

The system of this specification can provide users with the ability to customize a given font, e.g., for a specific use. More specifically, the system can provide a visual representation of a design space, e.g., the style variations represented by the range of allowable values of the font variation axes, of a font file and enable the user to make an informed adjustment of the one or more font variation parameters that control the allowable range of variation along the corresponding font variation axes to aid in the custom tailoring of a font file for their intended use. The system can receive the one or more selected font variation parameters and identify the relevant portion of the font file, thereby providing the user with a convenient way to interact with and adjust the font file without having to edit the font file directly, e.g., by using a command line interface, which is an impractical requirement for most users.

The number of fonts available for use is overwhelming and can saturate an individual attempting to find and select a font to present content for an intended use. The system can provide users with the ability to make controlled updates to a font file through the selection of font variation parameters and a way to visualize the changes the user makes by selecting the font variation parameters, which can guide a user to understand and identify the most optimal changes to the font file, e.g., as tailored by the user for the user's use case. In particular, a design space representation visualization can help both users who know exactly which style variations they are seeking and users who are unaware exactly which style variations they are seeking within a font to explore the possibilities most relevant to them within the font design space.

Furthermore, in some cases, a font file can contain more data, e.g., more variations of glyphs, than necessary for a user's needs. In particular, the font file can contain more font variation axes than preferred or the range of allowable values for one or more of the font variation axes can be larger than necessary for the intended use case. In this case, the font file production system can be used to reduce the size of the font file. As an example, depending on the selected font variation parameters, the system can reduce the size of the font file by a factor of 2, 10, or 100, thereby enabling faster transfer, download, and ease of use of font data. In particular, an end-user can share the reduced size font file via an electronic communication over a network, such as the internet, e.g., for rendering an application on an edge computing device with limited memory.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
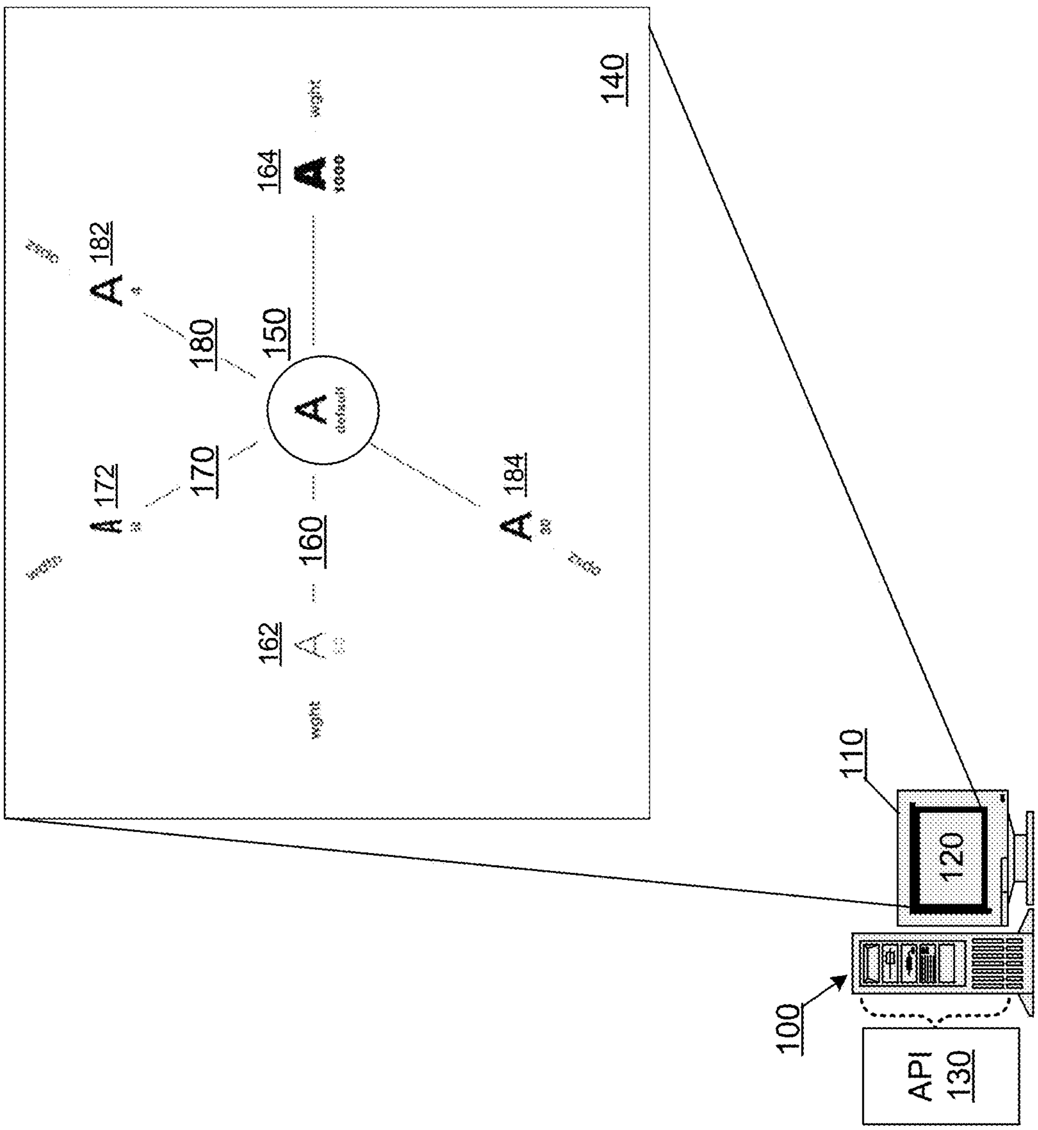
FIG. 1 illustrates a computer rendering a display panel containing an interactive font design space representation of a font file with multiple font variation axes.

Referring to FIG. 1, a computing device (e.g., computer system 100) presents on a display 110 an interface 120 that allows a user to interact with one or more data sources. For example, the one or more data sources can be provided over a network, such as the internet or an internally available network, or by an internally available storage system, e.g., the internal hard drive of the computer system 100. In the illustrated example, the data source is a website, specifically the website of a font service provider, which has been received and rendered by the computer system 100.

The display 110 is illustrated as presenting a webpage 140 from the website that contains a renderable applied programming interface (API) 130, e.g., renderable by computer system 100. In particular, the API 130 can enable a user, e.g., the user of computer device 100, to view a design space representation of a font file with one or more font variation axes, e.g., a graphical representation of the style variations corresponding with the one or more font variation axes in the font file. In this specification, a font variation axis refers to a defined axis of style variation for the one or more fonts in the font file. In particular, font variation axes relate the different style-type glyphs included within a given font file along a spectrum of interpolation. The one or more font variation axes can include one or more previously-defined style variations, e.g., the weight, width, etc., one or more user-defined style variations, e.g., round dots to square dots, different levels of pressure, etc. For example, the system can receive data including an additional font variation axis that can be added to the initial set of font variation axes, e.g., a user can add one or more user-defined font variation axes using the API 130. Within each font file, a sequence of glyphs represents the interpolation between the minimum and maximum allowable value for each font variation axis.

In some cases, the font file is an open-type variable font file. Open-type variable font files unify multiple static font styles, e.g., multiple styles of a typeface family, within a font family into a single font file with a set of registered font variation axes. More specifically, the open-type variable font file can be used to access all of the styles in between the multiple styles of the typeface family. In another case, the font file is a font file that includes multiple fonts with a set of font variation axes between each font type.

In particular, the number of styles in the font file with one or more font variation axes depends on the granularity of each font variation axis, e.g., each style contained in the font file can be represented as a coordinate that includes all of the font variation axes present in the font file. For example, a font with two axes, e.g., a weight and slant axis, in which the weight axis has allowable values from 1 to 1000 weight and the slant is either 0 for not slanted or 1 for slanted, can have up to 2000 possible styles for each glyph.

As an example, a font file can include one or more width- or weight-type glyphs for each character, and each width or weight-type glyph can be accessed by indexing with an allowable value, e.g., a value within a defined range of allowable values from the minimum to maximum allowable value, along the corresponding width or weight font variation axes. As another example, a font file can include more than one design attribute, such as serif, stencil, or handwritten design attributes, with one or more corresponding glyphs for each attribute. In a case in which more than one font is included in a font file, a morphing design attribute can control the variation between font glyphs, e.g., Helvetica to Times New Roman glyphs. Similarly, each glyph can be accessed by indexing with an allowable value along the corresponding font variation axis.

The number of font variation axes within a font file determines the dimension of the design space. In some cases, the font variation parameters can be selected from a graphical representation, e.g., a two-dimensional representation as depicted, of the design space of the font file. In this specification, the design space of the font file refers to the multi-dimensional space spanned by the one or more font variation axes as represented by the font file. Each font variation axis is a dimension within the design space, e.g., each axis can be seen as an axis in a multi-dimensional Cartesian coordinate system. In this case, the n-dimensional design space of the font file can be mapped to a visually realizable graphical representation for ease of use, such that the selector of the font variation parameters, e.g., the user, can visualize the boundaries of the design space as parameterized by the font variation parameters using the API 130.

In particular, the system can render the default style, e.g., the place where all font variation axes intersect, as a center point and one or more radial lines beginning at the default style center point for each font variation axis. In this case, the length of each radial line can relate the range of allowable values for each corresponding font variation axis, where the range depends on the selected font variation parameters that establish the first allowable value for the font variation axis. The system can further render a glyph at the terminus of each radial line to display the last allowable font variation style along that variation axis, e.g., the font variation style that corresponds with the selected font variation parameter. The glyph at the terminus can serve as a visual aid for the selector, e.g., the user, of the font variation parameters.

In the particular example depicted, the design space representation contains a two-dimensional representation of a three-dimensional font design space, e.g., a font design space parametrized by weight 150, width 160, and optical size (e.g., a parameter describing how the font is optimized for different font sizes) 170 axes. As another example, a design space parametrized by weight, width, height, italicized, bold, and serif-nonserif axes would have a six-dimensional font design space. In particular, the implementation of the font design space graphical representation for the example depicted for three-dimensions can be extended to a plurality of dimensions, e.g., 5, 10, and 20 dimensions, as described below.

More specifically, the API 130 can represent a default style of the font file as center point 150 and represent the range of allowable values for each font variation axis of the font file by the length of a radial line extending from the center point 150 to a terminus that represents a selected allowable value for the font variation axis. For example, the selected allowable value for the font variation axis can come from a user selecting a font variation parameter by modifying the terminus of the radial line, as will be described in further detail with respect to FIG. 2. More specifically, the range of values for each font variation axis as established by the terminus is the range of possible values of interpolation, e.g., variation of style, along that particular font variation axis.

The API 130 can additionally cause the displaying of a glyph at one or more termini of each radial line. In the particular example depicted, glyphs are displayed at the termini of every radial line. More specifically, the glyphs 162, 164, 172, 182, and 184 displayed correspond with the interpolated font variation for the letter A at the particular selected font variation parameter for each font variation axis. For example, the glyphs displayed for the weight axis 160 include the letter A 162 for a weight value of 50 and the letter A 164 for a weight value of 1000. As another example, the glyphs displayed for the optical size axis 170 include the letter A 182 for an optical size value of 4 and the letter A 184 for an optical size value of 30.

In this case, both the range of allowable values for the weight 160 and optical size 180 axes span the default style center point 150, which is defined as the place where all font variation axes intersect. In some cases, the range of allowable values for a font variation axis does not span the center point 150. For example, the glyph displayed for the width axis 170 includes the letter A 172 for a width of 50. In this case, the range of allowable values terminates at the default style center point 150. In particular, the API 130 can be implemented to prevent the user from selecting a font variation parameter beyond the default style center point 150, since allowing the range of allowable values for a given axis to be on the same side of the center point 150 would divorce the variation axes of the font file and prevent the API 130 from providing a unified design space representation.

Figure 2:
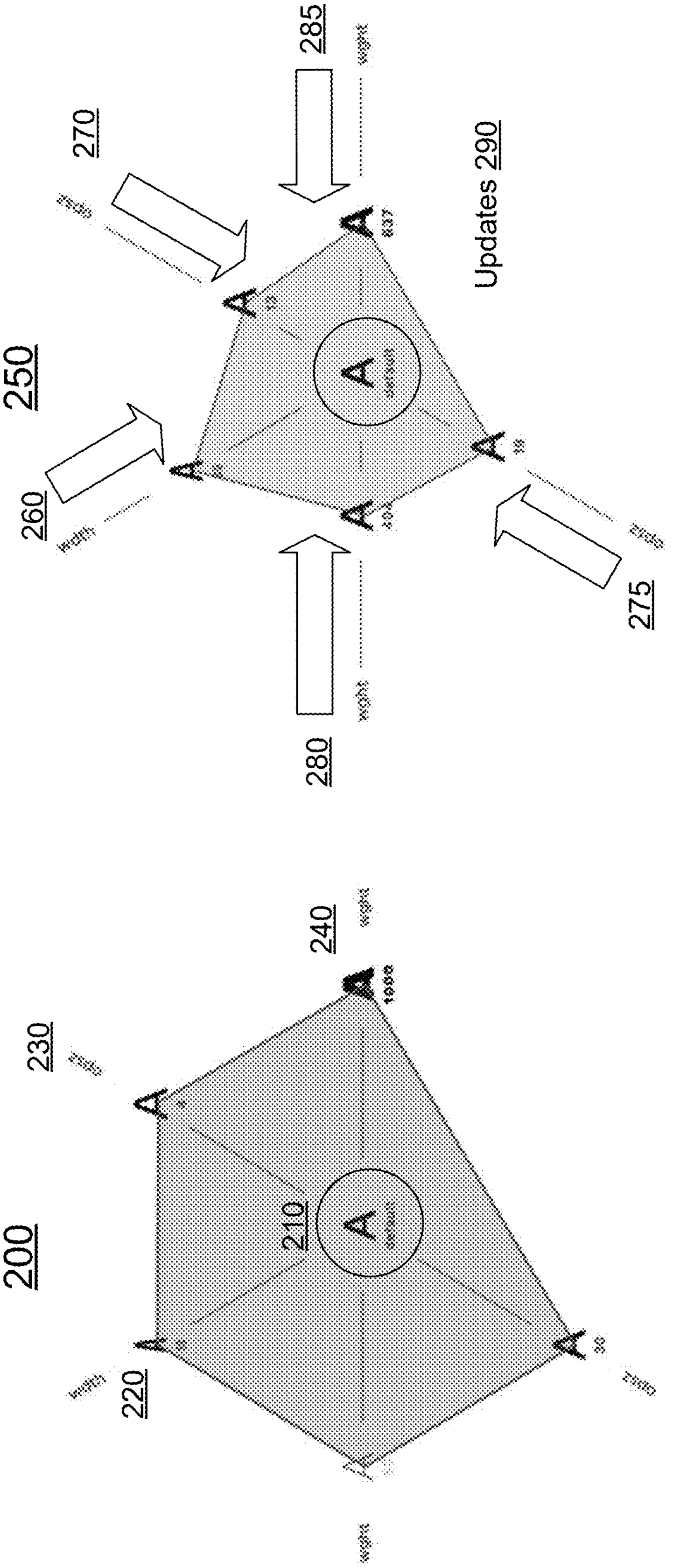
FIG. 2 graphically represents modifying the termini of one or more font variation axes using the font design space representation of FIG. 1 to select one or more font variation parameters that specify an allowable range of values for each axis.

FIG. 2 illustrates how a selector, e.g., the user of the computer in FIG. 1, can modify the termini of the font variation axes using the font design space representation to select font variation parameters that specify an allowable range of values for each axis. In particular, FIG. 2 displays how a user can update the range of values for the font variation axes of design space representation 200 to result in the updated design space representation 250.

The system of this specification can instantiate, e.g., generate different font files, from the font file by modifying the allowable range of values for each registered font variation axis. In particular, each font variation parameter can be selected, e.g., by a user, to establish an allowable value that limits the range of a font's variation along the corresponding font variation axis within the font file. In particular, the selected allowable value can be a minimum allowable value within the range of allowable values or a maximum allowable value within the range of allowable values for the font variation axis that truncates the range of allowable values.

An API, e.g., the API 130 of FIG. 1, can provide a convenient way for the user to select a range of allowable values for each font variation axis of a first font file as displayed by the design space representation. In particular, the API can allow a user to select a font variation parameter for each font variation axis to establish one or more allowable values that limit the range of a font's variation along the corresponding font variation axis within the font file. As an example, the selected allowable value can be a minimum allowable value within the range of allowable values or a maximum allowable value within the range of allowable values for the font variation axis. As another example, the selected allowable values can specify the removal of the font variation axis, e.g., by setting the minimum allowable value to be greater than the maximum allowable value or the maximum allowable value to be less than the minimum allowable value for a particular font variation axis.

The system can receive the one or more selected font variation parameters, e.g., over a network, from the selector adjusting the termini of each radial line. The system can then identify a portion of the first font file based on the one or more selected font variation parameters, e.g., using the two-dimensional design space representation. More specifically, for each font variation parameter, the system can modify, e.g., truncate, the range of allowable values along the corresponding font variation axis for the first font file and generate a second font file with the updated set of variation axes, e.g., a custom design variation font file.

The range of allowable values for each font variation axis is limited by the lower and upper bounds established by the smallest and largest values of the range of the particular font variation axis in the font file with the largest range of values for the font variation axis. More specifically, a font file provider can provide the API with the design space representation and can maintain a font file database containing a number of font files that can be used for generating a custom design variation font file. In this case, the font service provider can identify the font file with the largest range of values for a particular font variation axis, as will be described in more detail with respect to FIG. 3. The user cannot select an allowable value for a variation axis below the smallest value or above the largest value contained in the font files.

Depending on where the default termini of each radial line is initially rendered, e.g., with respect to the smallest and largest values allowable for each respective font variation axis, the range of allowable values for the font variation axis can either be increased, decreased, or both with respect to the terminus. For example, if the API initializes the default termini as the mean value of the smallest and largest values of the range, then the user can either increase or decrease the allowable values up to the maximum or minimum values of the range, respectively. As another example, if the default termini are rendered as the minimum or maximum values included in the range, then the user can be limited to either increase from the minimum value or decrease from the maximum value when selecting the font variation parameter.

In the particular example depicted, the design space representation 200 can include a width 220, optical size 230, and weight 240 axis. As an example, the API can provide a sliding bar to update the range of allowable values along each font variation axis, e.g., the terminus of each radial line can include a moveable endpoint that can be slid up and down the range of allowable values of the font variation axis as represented by the radial line. As another example, the API can provide a text field input for a user to input the value of the selected allowable value as the font variation parameter for the font variation axis. As yet another example, the API can provide a drop-down menu with selectable predetermined values. In particular, the modification of the range of allowable values for each font variation axis can be processed by a font service provider as part of a font file production system, e.g., a font file production system as depicted with respect to FIG. 3, to generate the custom design variation font file.

In the particular example depicted, the user can update the font variation axes of the font file in a series of one or more updates 290, e.g., wherein each update controls the range of allowable values for each of the font variation axes, from the design space representation 200 to result in the design space representation 250. More specifically, the updates 290 can include updates as a result of modifying the allowable range for the width 220, optical size 230, and weight 240 axes. In particular, the updates 290 that decrease the range of allowable values are represented by outlined arrows pointing toward the default style center point 250.

In this case, the updates 290 can include updates to the width axis 220. In particular, a user can select a font variation parameter for the width variation axis, e.g., by moving the terminus of the radial line corresponding with the width font variation axis, resulting in an increase 260 from the default width of the center point 210 to the minimum width value of 50 (e.g., the width of design space representation 200) to the minimum width value of 69, thereby decreasing the range of allowable values. As another example, a user can select a font variation parameter for the optical size axis resulting in an increase 270 of the minimum allowable value from 4 to 13 and another font variation parameter resulting in a decrease 275 of the maximum allowable value from 30 to 19, thereby decreasing the range of allowable values. As yet another example, a user can select a font variation parameter for the weight axis resulting in an increase 280 of the minimum allowable value from 50 to 404 and another font variation parameter resulting in a decrease 285 of the maximum allowable value from 1000 to 637, thereby decreasing the range of allowable values.

In particular, each time the user modifies at least one font variation axis, the API can reflect how the design space changes in accordance with the range of allowable values established by the most recently selected font variation parameters. More specifically, the design space representation 250 can show the outcome of the updated font variation axes, e.g., by rendering a reference glyph such as an A at the terminus of each line. As an example, the system can allow a user to select any glyph in the font to represent the allowable value of the font variation axis specified by the terminus. In particular, the API can provide a dropdown menu for the user to select the reference glyph to aid in editing the design space, e.g., the reference glyph can be changed at any time during the editing process.

In some cases, the reference glyph rendered at the terminus can automatically re-render to reflect a change in the range of allowable values for the font variation axis, e.g., when a user selects a font variation parameter for the font variation axis. In particular, as a user makes updates, e.g., updates 290, by modifying the termini of the radial lines, the rendered reference glyph that corresponds with the update can re-render according to the most recently selected font variation parameter. The design space visualization provides the user with a way of viewing the effect of updates to the range of allowable values for each font variation axis.

Additionally, in some cases, the API can provide the user with the ability to control which subset of glyphs in the font file the one or more font variation axes are applied to, e.g., by providing a mechanism for the user to select and deselect every character that each font variation axis applies to. In particular, the user can elect to apply a specific font variation axis to one, many, or all of the glyphs in a font file. If a glyph is affected by more than one variation axis, the font variation parameters of each axis will affect the outcome of the glyph in the font file and as rendered by the API. In the case of a user selecting a subset of glyphs that a specific font variation axis pertains to, the glyph rendered at the terminus for the font variation axis can be one of the glyphs in the subset.

Figure 3:
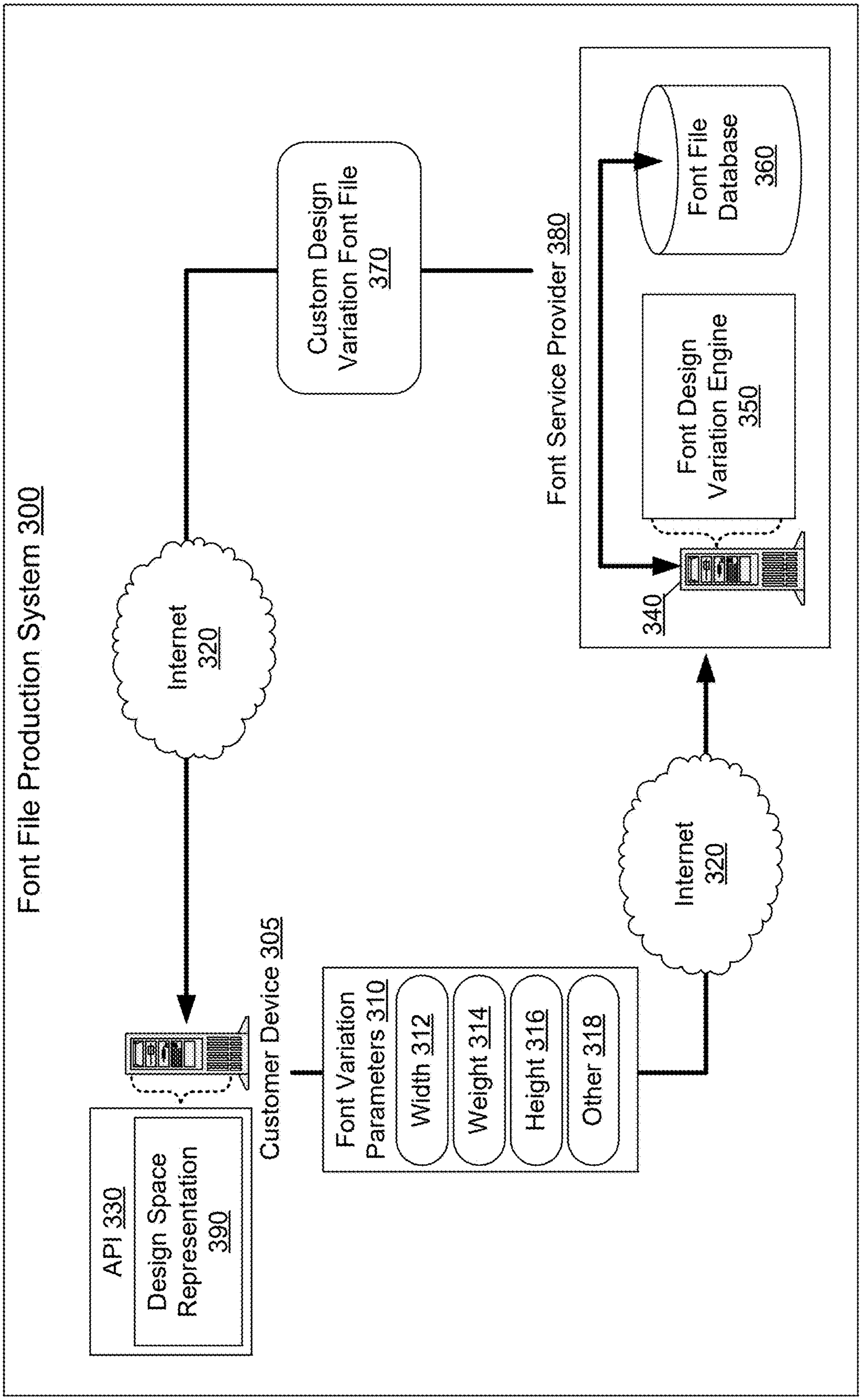
FIG. 3 is a system diagram of an example font file production system, e.g., a system that can generate a custom design variation font file using a font design variation engine.

The API can enable a user to interact with the design space representation as described above to generate a custom-design font file according to the selected font variation parameters. FIG. 3 is a system diagram of an example font file production system 300, e.g., a system that can generate an updated font file based on the selected font variation parameters. The font file production system 300 is an example of a system implemented as computer programs on one or more computers in one or more locations in which the systems, components, and techniques described below are implemented. In particular, FIG. 3 illustrates the production of a custom design font variation file by a font service provider 380, an entity that generates, maintains, and distributes fonts based on the selected font variation parameters.

After the selector, e.g., a user, has modified the termini of the radial lines corresponding with each font variation axis, the user can select an advancement button to trigger the font file production system 300 to process corresponding selected font variation parameters 310, e.g., using the API 130 of FIG. 1, in order to provide the font variation parameters 310 to the font file production system 300. The font file production system 300 can then identify a portion, e.g., the portion that corresponds with the range of allowable values for each font variation axis, of the font file in accordance with the font variation parameters 310.

In this example, the font service provider 380 can process the font variation parameters 310, e.g., the selected font variation parameters from the user-updated variation axes in the design space representation of FIG. 2, using a font design variation engine 350. More specifically, the font service provider 380, can use a font design variation engine 350 (that can be run on a computer system 340 located at the font service provider 380) to generate the custom design variation font file 370. The system can employ one or more methods to generate the custom design variation font file 370, e.g., using a font file database 360, as will be described in more detail with respect to FIG. 4.

In particular, the font file database 360 can maintain a number of font files, each including relevant data for one or more fonts, e.g., the data for each style of the one or more fonts along each combination of font variation axes within the font file. As an example, the font file can contain a sequence of one or more glyphs for each font variation axis from the minimum allowable value to the maximum allowable value of the range of allowable values for the font variation axis, e.g., the glyph shapes can be determined by interpolating between the minimum and maximum allowable values at each index of the range of allowable values. As another example, the font file can contain sequences of glyphs relating to the intersection of one or more font variation axes and the corresponding interpolation of values along each font variation axis.

In the example depicted, the font service provider 380 can be employed by a number of customer devices 305, to produce the custom design variation font file 370, e.g., using customer selected font variation parameters. In particular, the font service provider 380 can provide an API 330, e.g., the API 130, over a network, e.g., the internet 320, to enable the customer device 305 to interact with a design space representation 390, in order to update the font variation axes. In the particular example depicted, the font service provider 380 can provide the API 330 over the internet 320 that enables the customer device 305 to select the one or more font variation parameters 310.

In the particular example depicted, the user of customer device 305, can submit the font variation parameters 310 to the font service provider 380 using the same network the API 330 is provided over, e.g., the internet 320. More specifically, the customer device 305 can provide font variation parameters for each font variation axis, e.g., font variation parameters for the width 312, weight 314, height 316 axes, as well as font variation parameters associated with other 318 font variation axes. As an example, the other axes 318 can include an italicized or bold axis, or a stencil or a flourish axis describing the style and artistic flair of the font.

The font service provider 380 can receive the font variation parameters 310 from the customer device 305 and process the parameters 310 to update the corresponding font variation axes using the font design variation engine 350 and the font file database 360. In some cases, the font design engine 350 applies the font variation parameters 310 to identify the relevant portion of the font file. An example method for identifying the relevant portions of the font file to generate a custom design variation font file 370 using a font design variation engine 350 is described with respect to FIG. 4.

The font service provider 380 can then initiate the transmission of the custom design variation font file 370 using a network, e.g., the internet 320, back to the customer device 305. The custom design variation font file 370 can include the glyphs determined by each font variation axis's allowable range. The user of the customer device 305 can then view and interact with the custom design variation font file 370 using the design space representation 390 provided by the API 330, e.g., the design space representations of FIGS. 1 and 2, using the customer device 305. In particular, the customer device 305 can allow the user to modify the range of allowable values along each font variation axis as described in FIG. 2.

In some cases, the font service provider 380 can offer the customer device 305 the option to iteratively update successive font files, e.g., successive custom design variation font files 370. In this case, the user can use the customer device 305 to continuously view and interact with the design space representation 390 to modify one or more of the font variation axes by selecting one or more font variation parameters 310. More specifically, the user can interact with the design space representation 390 at time t of the font file for time t and select font variation parameters at time t. The font service provider 380 can then generate the custom design variation font file 370 for time t+1 in accordance with the selected font variation parameters at time t, and the user can then select font variation parameters t+1, resulting in the generation of the custom design variation font file 370 for time t+2, and so on. In this case, the system 300 can provide the custom design variation font file 370 to the API 330 in real-time or near real-time, e.g., within a limited waiting period in which the API 330 displays the progress and is informed of the completion of the update of the font file. More specifically, the system 300 can enable the near real-time monitoring and display of the resulting custom design variation font file 370 to aid the user's decisions with respect to the font design space.

Figure 4:
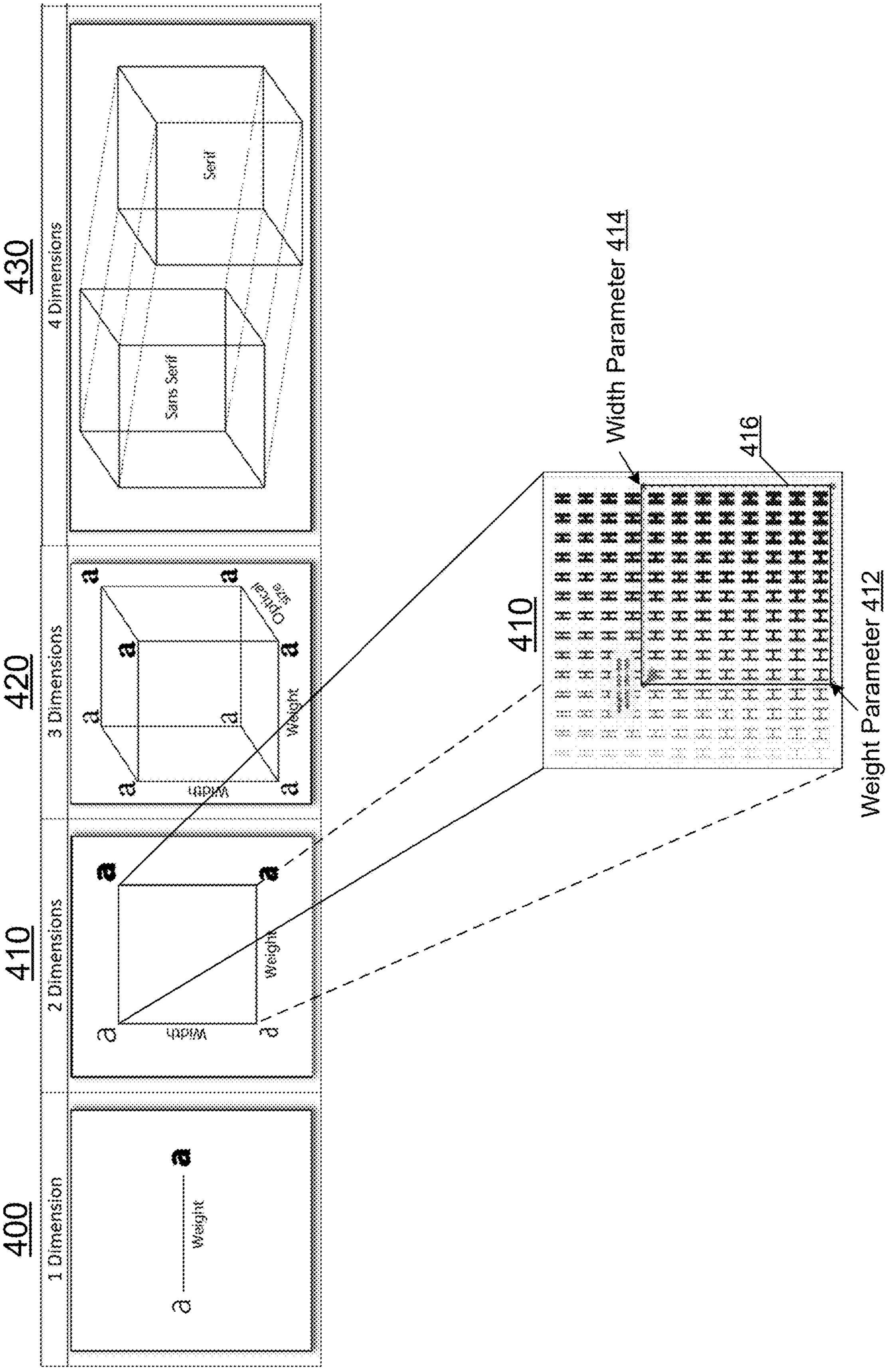
FIG. 4 demonstrates how a font design variation engine can generate a custom design variation font file by identifying the portion of a font file corresponding with the updated font variation axes.

FIG. 4 illustrates how a font design variation engine, e.g., the font design variation engine 350 of FIG. 3, can generate a custom design variation font file by identifying the relevant portion of a font file from a font file database.

In particular, the font design variation engine can receive the selected font variation parameters and identify a font file from a font database for processing. The font design variation engine can then process font file in accordance with the selected font variation parameters, e.g., using a command line tool, to identify the portion of the font file that corresponds with the user-selected font variation parameters. Identifying the relevant portion of the font file depends on the number of variation axes represented in the font file and the number of variation axes the selector, e.g., the user, intends to keep in the custom design variation font file, as will be described in further detail below.

As an example, the font design variation engine can access a command line interface and use a software tool (e.g., an open-source software tool) such as a font-tools library to define the updated design space for the custom font file. More specifically, the font design variation engine can access the command line interface to input a ratio of the minimum allowable value to the maximum allowable value. In some cases, the font design variation engine can use the command line interface to remove a font variation axis entirely from the font file.

In particular, the font design variation engine can host a frontend, e.g., a frontend that provides the API 330 of FIG. 3, and can run the command line interface as a backend service for a customer device, e.g., the customer device 305 of FIG. 3. For example, the font design variation engine can use a subprocess on the computer system that hosts the font design variation engine, e.g., the computer system 340 of FIG. 3, to run the command line interface and can provide the output, e.g., the custom design variation font file 370 of FIG. 3, to the customer using a network, e.g., the internet 320 of FIG. 3.

In particular, FIG. 4 illustrates how each font variation axis of a font file corresponds with an additional dimension in font design space. For example, a weight variation axis results in a one-dimensional design space 400, the addition of a width axis to the weight variation axis results in a two-dimensional design space 410. As a further example, the addition of an optical size axis results in a three-dimensional design space 420, and the addition of a serif axis results in a four-dimensional design space 430.

In the particular example depicted, which focuses on the two-dimensional design space 410, the font design variation engine can identify the relevant portion 416 of the two-dimensional design space 420 using the corresponding two font variation parameters, a weight parameter 412 and a width parameter 414, e.g., selected font variation parameters defining an allowable value of the weight and width, respectively. In this case, the weight parameter 412 and the width parameter 414 are values less than the current maximum of the range of allowable values for both the weight and the width of the font file, as represented by the relevant portion 416, which is a subset of the two-dimensional design space 410.

In particular, the relevant portion 416 covers a smaller area of the square grid of glyphs in the font file based on combinations of allowable values on both the width and weight font variation axes. More specifically, the font design variation engine can modify the range of available values, e.g., using a command line interface, in the font file by truncating the values to result in the relevant portion 416, e.g., the engine can set a new upper and lower bound for each font variation axis in accordance with the selected weight 412 and width 414 font variation parameters.

In the particular case in which a user has successively updated the range of allowable values for a font variation axis, e.g., by generating a sequence of custom variation font files, the selected font variation parameters can be greater than the current maximum of the range of the allowable values of the most recently received custom design variation font file. In particular, the selected values do not need to be limited to the current range since another font file, e.g., the first edited font file, can contain a range for the font variation axis that is greater than the range provided by the most recently received custom design variation font file. In this case, the font design variation engine can modify the range of available values according to the user selecting font variation parameters greater than the current maximum in the current font file by truncating the values in another font file, e.g., from the font file database.

As depicted in the example, the relevant portion 416 for the two-dimensional design space 410 is a square containing glyphs of different variations along both the weight and width variation axes of the font file. The system can then use the identified portion 416 of the font file to generate a custom design variation font file that includes the corresponding updated ranges for each font variation axis, which can be transmitted, e.g., using a network, e.g., the internet 320 of FIG. 3, back to a user, e.g., the user that selected the weight 412 and width 414 parameters.

This description can be easily extended to any number of axes. For example, in the case of a single axis, e.g., the weight axis representation 400, truncating the values of the range of the weight axis results in a shorter line segment between the minimum weight and the maximum weight of the custom design font file. As another example, in the case of the three-dimensional design space 420, truncating the values of the range of the variation axes as defined by the corresponding font variation parameters results in identifying a rectangular prism within the weight-width-optical size cube in accordance with each axis's respective parameter. As yet another example, in the case of the four-dimensional design space 430, truncating the values of the weight-width-optical size-serif hypercube results in a hyperrectangle, e.g., a four-dimensional extension of a rectangular prism, as defined by the corresponding font variation parameters.

Figure 5:
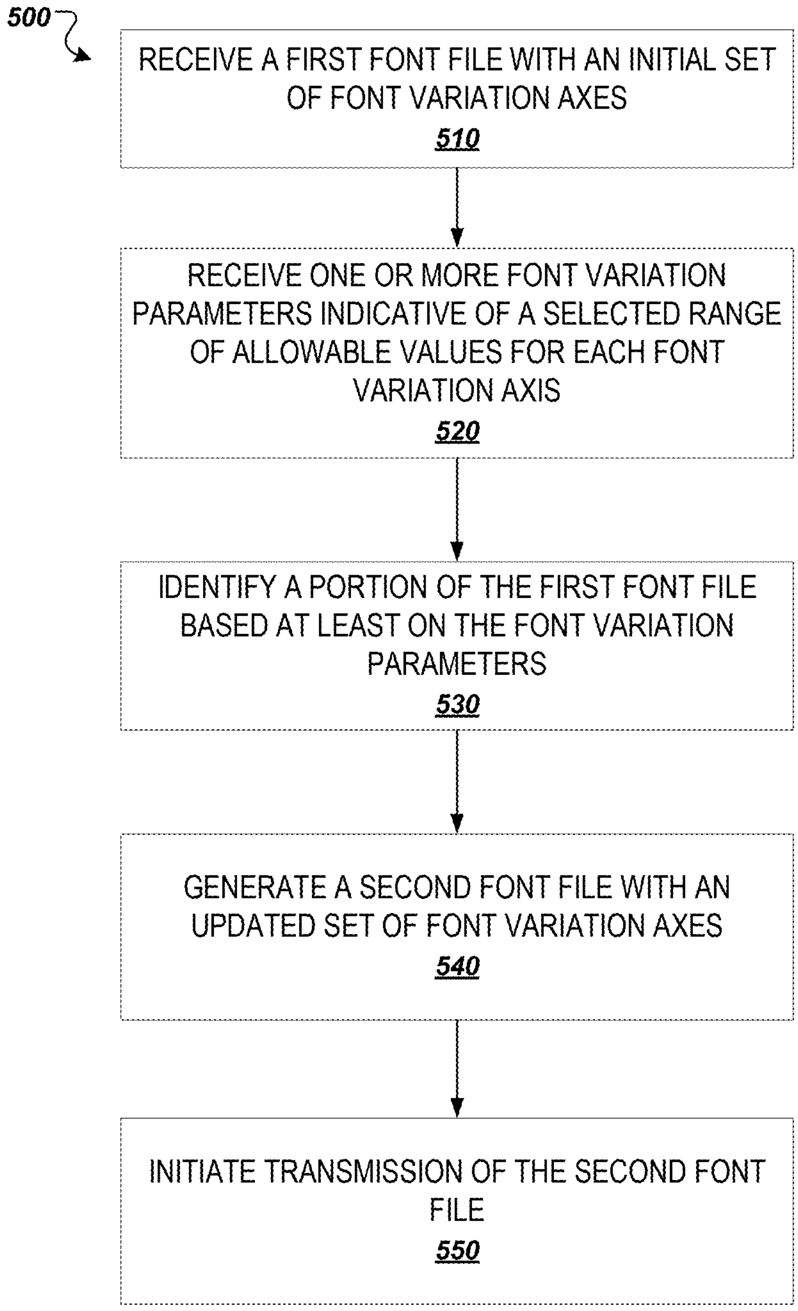
FIG. 5 is an example flow chart of operations that can be executed by a font design variation engine to generate a custom design variation font file using font variation parameters.

FIG. 5 is a flow diagram of an example process of operations for generating a custom design variation font file. For convenience, the process 500 will be described as being performed by a system of one or more computers located in one or more locations. For example, a font service provider, e.g., the font service provider 380 of FIG. 3, appropriately programmed in accordance with this specification, can perform the process 500, e.g., using the custom design variation engine 350.

The engine can receive a first font file with an initial set of one or more font variation axes, each indicative of a style for the one or more fonts included in the first font file (step 510). In particular, a font variation axis can refer to a defined axis of style for the one or more fonts in the font file, e.g., font variation axes relate the different style-type glyphs included within a given font file along a spectrum of interpolation. As an example, a style can include bold, italicized, or connected letters. As another example, a style can include the weight or width of glyphs. The initial set of font variation axes can include one or more previously-defined font variation axes. In some cases, a selector, e.g., a user, can add one or more user-defined font variation axes to the initial set of font variation axes. In some cases, the engine can receive an open-variable font type with a predetermined number of previously defined font variation axes.

The engine can receive one or more font variation parameters indicative of a selected range of allowable values for each font variation axis (step 520). In particular, each font variation axis can correspond with an allowable range of values that determines a sequence of glyphs along the corresponding font variation axis, e.g., in which each glyph corresponds with an interpolation between the minimum and maximum selected allowable value for each font variation axis. As an example, these font variation parameters can come from a selector, e.g., a user, selecting an allowable value, e.g., the minimum or maximum allowable value, for the range of allowable values for each font variation axis.

In some cases, the user can select the range of allowable values using a design space representation, e.g., a graphical representation as rendered by an applied programming interface (API). In particular, the API can provide the user with a means of visualizing the multidimensional design space representation and can enable the selector to modify the length of one or more radial lines extending from a default style center point corresponding to each font variation axis of the font file to adjust the range of allowable values in accordance with the position of the termini of the radial lines.

The engine can then identify a portion of the first font file based at least on the font variation parameters (step 530). As an example, the engine can use a custom design variation engine to modify, e.g., truncate or extend the range of, the allowable values of the corresponding font variation axis. In particular, the engine can generate an updated font variation axis in accordance with the selected allowable value of each font variation parameter. As an example, the engine can prevent the user from selecting font variation parameter values outside of the range of values provided by a font file with the maximum range of allowable values for the particular font variation axis, e.g., as defined by the first edited font file.

The engine can then generate a second font file with an updated set of font variation axes (step 540), and initiate transmission of the second font file (step 550). In particular, the second font file can be a custom design variation font file. As an example, the engine can transmit the custom design variation font file to the selector, e.g., the user, over a network, e.g., the internet, and use an API to display the design space representation of the custom design variation font file. In this case, the user can then use the API to interact with the design space representation of the custom design variation font file. In some cases, the user can further modify the font variation parameters, in which case the engine can return to and repeat steps 520-550, e.g., as many times as the user continues to use the API to select font variation parameters.

Figure 6:
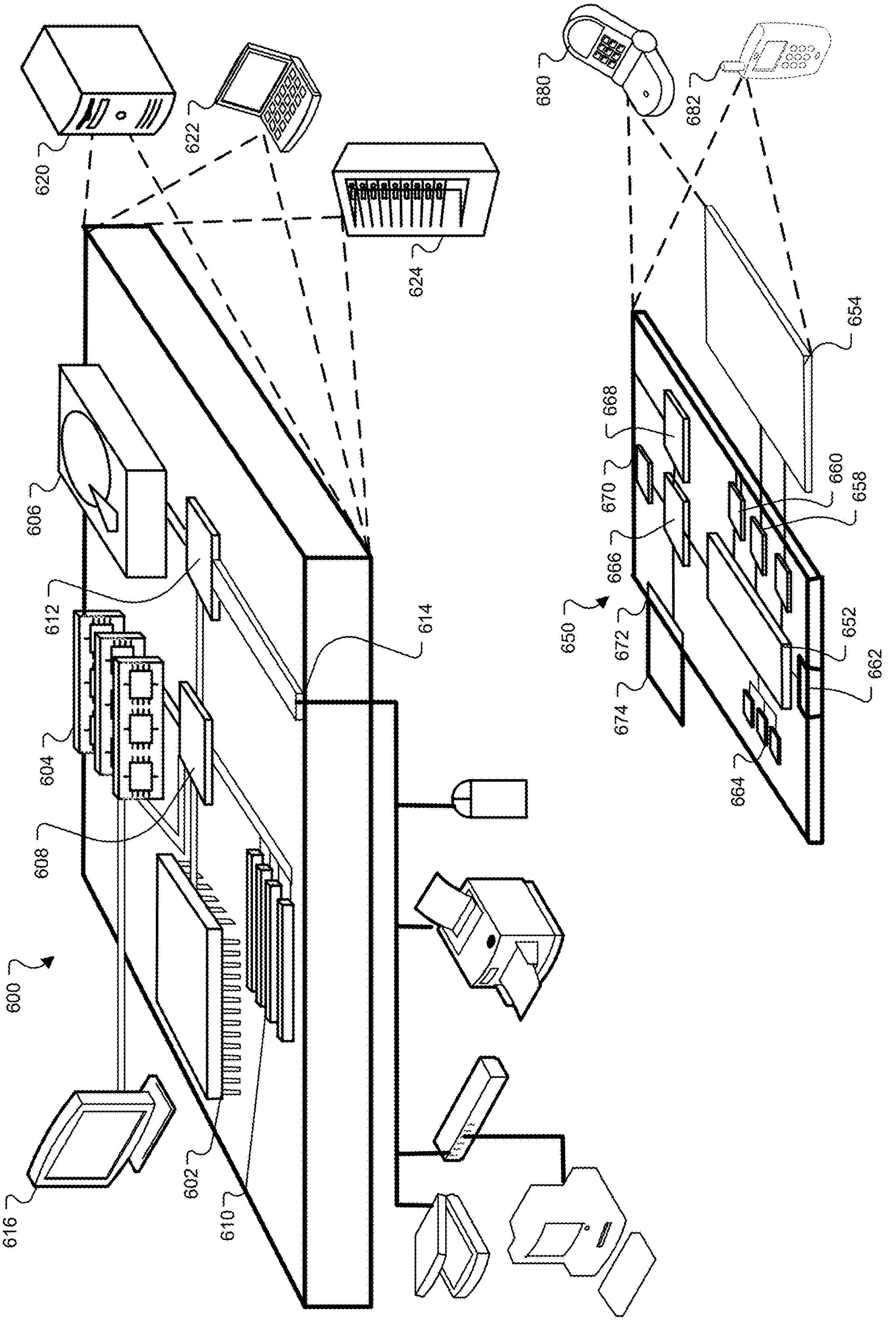
FIG. 6 illustrates an example of a computing device and a mobile computing device that can be used to implement the techniques described here.

FIG. 6 shows an example of example computer device 600 and example mobile computer device 650, which can be used to implement the techniques described herein. For example, a portion or all of the operations for selecting font variation parameters, generating a custom design variation font file, etc. may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low-speed interface 612 connecting to low-speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606 to display graphical data for a GUI on an external input/output device, including, e.g., display 616 coupled to high-speed interface 608. In other implementations, multiple processors and/or multiple busses can be used, as appropriate, along with multiple memories and types of memory.

Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium (e.g., a magnetic or optical disk. Memory 604 may be non-transitory.)

Storage device 606 is capable of providing mass storage for computing device 600. In one implementation, storage device 606 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 604, storage device 606, memory on processor 602, and the like.)

High-speed controller 608 manages bandwidth-intensive operations for computing device 600, while low-speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622.) In some examples, components from computing device 600 can be combined with other components in a mobile device (not shown), e.g., device 650. Each of such devices can contain one or more of computing device 600, 650, and an entire system can be made up of multiple computing devices 600, 650 communicating with each other.

Computing device 650 includes processor 652, memory 664, an input/output device (e.g., display 654, communication interface 666, and transceiver 668) among other components. Device 650 also can be provided with a storage device, (e.g., a microdrive or other device) to provide additional storage. Each of components 650, 652, 664, 654, 666, and 668, are interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for coordination of the other components of device 650, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations, and multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 650 through expansion interface 672, which can include, for example, a SIMM (Single In Line Memory Module) card interface. Such expansion memory 674 can provide extra storage space for device 650, or also can store applications or other data for device 650. Specifically, expansion memory 674 can include instructions to carry out or supplement the processes described above, and can include secure data also. Thus, for example, expansion memory 674 can be provided as a security module for device 650, and can be programmed with instructions that permit secure use of device 650. In addition, secure applications can be provided through the SIMM cards, along with additional data, (e.g., placing identifying data on the SIMM card in a non-hackable manner.)

The memory 664 can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 664, expansion memory 674, and/or memory on processor 652), which can be received, for example, over transceiver 668 or external interface 662.

Device 650 can communicate wirelessly through communication interface 666, which can include digital signal processing circuitry where necessary. Communication interface 666 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 668. In addition, short-range communication can occur, e.g., using a Bluetooth®, WiFi, or other such transceiver (not shown). In addition, GPS (Global Positioning System) receiver module 670 can provide additional navigation- and location-related wireless data to device 650, which can be used as appropriate by applications running on device 650. Sensors and modules such as cameras, microphones, compasses, accelerators (for orientation sensing), etc. may be included in the device.

Device 650 also can communicate audibly using audio codec 660, which can receive spoken data from a user and convert it to usable digital data. Audio codec 660 can likewise generate audible sound for a user, (e.g., through a speaker in a handset of device 650.) Such sound can include sound from voice telephone calls, can include recorded sound (e.g., voice messages, music files, and the like) and also can include sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:

receiving a first font file comprising data that represents one or more fonts and an initial set of font variation axes, each font variation axis indicative of a style for the one or more fonts and comprising a first range of allowable values from a first minimum allowable value to a first maximum allowable value;

receiving, from a user selection on a user interface comprising a graphical representation, data representing one or more font variation parameters, wherein each font variation parameter relates to a first selected allowable value within the first range of allowable values for a corresponding font variation axis of the set of font variation axes;

identifying a portion of the first font file based at least on the one or more font variation parameters;

generating a second font file comprising data that represents an updated set of font variation axes, at least one updated font variation axis comprising a second, customized range of allowable values from a second minimum allowable value to a second maximum allowable value based at least on the portion of the first font file identified by the one or more font variation parameters; and initiating transmission of the second font file.

2. The computer-implemented method of claim 1, wherein the data of the first font file represents a first design space parametrized by the initial set of font variation axes and the data of the second font file represents a second design space parametrized by the updated set of font variation axes.

3. The computer-implemented method of claim 2, wherein the data of the second font file is renderable to present a graphical representation of the second design space.

4. The computer-implemented method of claim 1, wherein the graphical representation comprises a default style center point and a radial line for each font variation axis in the updated set of font variation axes beginning at the default style center point, wherein a length of each radial line is indicative of the second, customized range of allowable values from the default style center point to a terminus representing the first selected allowable value for the corresponding font variation axis based on the data representing one or more font variation parameters.

5. The computer-implemented method of claim 4, wherein the graphical representation comprises a graphical representation of one or more glyphs at the terminus of each radial line corresponding with the first selected allowable value for the updated font variation axis.

6. The computer-implemented method of claim 4, further comprising receiving data corresponding to one or more termini of each radial line, wherein the data comprises a selection of the one or more font variation parameters along each font variation axis.

7. The computer-implemented method of claim 1, wherein identifying the portion of the first font file comprises, for each font variation parameter:

truncating the range of allowable values of the corresponding font variation axis to generate an updated variation axis in accordance with the first selected allowable value of the font variation parameter.

8. The computer-implemented method of claim 1, wherein the first font file is an open-type variable font file.

9. The computer-implemented method of claim 1, further comprising:

receiving a user-defined font variation axis; and adding the user-defined font variation axis to the initial set of font variation axes.

10. A system comprising one or more computer and one or more storage devices storing instructions that are operable, when executed by the one or more computers, to cause the one or more computers to perform operations comprising:

receiving a first font file comprising data that represents one or more fonts and an initial set of font variation axes, each font variation axis indicative of a style for the one or more fonts and comprising a first range of allowable values from a first minimum allowable value to a first maximum allowable value;

receiving, from a user selection on a user interface comprising a graphical representation, data representing one or more font variation parameters, wherein each font variation parameter relates to a first selected allowable value within the first range of allowable values for a corresponding font variation axis of the set of font variation axes;

identifying a portion of the first font file based at least on the one or more font variation parameters;

generating a second font file comprising data that represents an updated set of font variation axes, at least one updated font variation axis comprising a second, customized range of allowable values from a second minimum allowable value to a second maximum allowable value based at least on the portion of the first font file identified by the one or more font variation parameters; and initiating transmission of the second font file.

11. The system of claim 10, wherein the data of the first font file represents a first design space parametrized by the initial set of font variation axes and the data of the second font file represents a second design space parametrized by the updated set of font variation axes.

12. The system of claim 11, wherein the data of the second font file is renderable to present a graphical representation of the second design space.

13. The system of claim 10, wherein the graphical representation comprises a default style center point and a radial line for each font variation axis in the updated set of font variation axes beginning at the default style center point, wherein a length of each radial line is indicative of the second, customized range of allowable values from the default style center point to a terminus representing the first selected allowable value for the corresponding font variation axis based on the data representing one or more font variation parameters.

14. The system of claim 13, wherein the operations further comprise receiving data corresponding to one or more termini of each radial line, wherein the data comprises a selection of the one or more font variation parameters along each font variation axis.

15. The system of claim 10, wherein the operations further comprise identifying the portion of the first font file comprises, for each font variation parameter:

truncating the range of allowable values of the corresponding font variation axis to generate an updated variation axis in accordance with the first selected allowable value of the font variation parameter.

16. A computer storage medium encoded with a computer program, the program comprising instructions that are operable, when executed by a data processing apparatus, to cause the data processing apparatus to perform operations comprising:

receiving a first font file comprising data that represents one or more fonts and an initial set of font variation axes, each font variation axis indicative of a style for the one or more fonts and comprising a first range of allowable values from a first minimum allowable value to a first maximum allowable value;

receiving, from a user selection on a user interface comprising a graphical representation, data representing one or more font variation parameters, wherein each font variation parameter relates to a first selected allowable value within the first range of allowable values for a corresponding font variation axis of the set of font variation axes;

identifying a portion of the first font file based at least on the one or more font variation parameters;

generating a second font file comprising data that represents an updated set of font variation axes, at least one updated font variation axis comprising a second, customized range of allowable values from a second minimum allowable value to a second maximum allowable value based at least on the portion of the first font file identified by the one or more font variation parameters; and initiating transmission of the second font file.

17. The computer storage medium of claim 16, wherein the data of the first font file represents a first design space parametrized by the initial set of font variation axes and the data of the second font file represents a second design space parametrized by the updated set of font variation axes.

18. The computer storage medium of claim 17, wherein the data of the second font file is renderable to present a graphical representation of the second design space.

19. The computer storage medium of claim 16, wherein the graphical representation comprises a default style center point and a radial line for each font variation axis in the updated set of font variation axes beginning at the default style center point, wherein a length of each radial line is indicative of the second, customized range of allowable values from the default style center point to a terminus representing the first selected allowable value for the corresponding font variation axis based on the data representing one or more font variation parameters.

20. The computer storage medium of claim 19, wherein the operations further comprise receiving data corresponding to one or more termini of each radial line, wherein the data comprises a selection of the one or more font variation parameters along each font variation axis.

* * * * *